(12) United States Patent
Mendonsa et al.

(10) Patent No.: US 11,948,606 B2
(45) Date of Patent: Apr. 2, 2024

(54) ADAPTIVE MANUFACTURING SYSTEMS, METHODS, AND DEVICES

(71) Applicant: Seagate Technology LLC, Fremont, CA (US)

(72) Inventors: Riyan Alex Mendonsa, Edina, MN (US); Brett R. Herdendorf, Mound, MN (US); Anil J. Reddy, Minneapolis, MN (US); Iraj Jabbari, La Jolla, CA (US)

(73) Assignee: Seagate Technology LLC, Fremont, CA (US)

( * ) Notice: Subject to any disclaimer, the term of this patent is extended or adjusted under 35 U.S.C. 154(b) by 111 days.

(21) Appl. No.: 17/698,343

(22) Filed: Mar. 18, 2022

(65) Prior Publication Data
US 2022/0206458 A1    Jun. 30, 2022

Related U.S. Application Data

(63) Continuation of application No. 16/455,304, filed on Jun. 27, 2019, now Pat. No. 11,281,184.

(51) Int. Cl.
*G11B 33/08* (2006.01)
*G05B 19/4097* (2006.01)
*G11B 33/12* (2006.01)
*G11B 33/14* (2006.01)
*H02K 5/16* (2006.01)

(52) U.S. Cl.
CPC .......... *G11B 33/08* (2013.01); *G05B 19/4097* (2013.01); *G11B 33/121* (2013.01); *G11B 33/14* (2013.01); *H02K 5/163* (2013.01); *G05B 2219/36116* (2013.01)

(58) Field of Classification Search
None
See application file for complete search history.

(56) References Cited

U.S. PATENT DOCUMENTS

| | | | |
|---|---|---|---|
| 5,632,551 A | 5/1997 | Roney et al. | |
| 5,745,471 A * | 4/1998 | Son | G11B 33/08 720/694 |
| 5,751,514 A | 5/1998 | Hyde et al. | |
| 5,815,350 A * | 9/1998 | Kennedy | G11B 5/54 |
| 6,005,768 A | 12/1999 | Jo | |
| 6,166,901 A * | 12/2000 | Gamble | G06F 1/184 248/560 |
| 6,292,455 B1 * | 9/2001 | Saruwatari | G11B 25/043 |
| 6,469,864 B2 | 10/2002 | Kamezawa et al. | |
| 7,652,845 B2 | 1/2010 | Xu et al. | |
| 7,829,793 B2 | 11/2010 | Schreiber et al. | |
| 8,547,658 B1 | 10/2013 | Szeremeta | |
| 8,837,080 B2 | 9/2014 | McGuire, Jr. | |
| 8,947,825 B2 | 2/2015 | Thijssen | |
| 10,002,645 B2 | 6/2018 | McGuire, Jr. | |
| 10,460,767 B2 | 10/2019 | Yoneda et al. | |
| 10,559,327 B2 | 2/2020 | Yoshimura et al. | |

(Continued)

*Primary Examiner* — Peter Vincent Agustin
(74) *Attorney, Agent, or Firm* — Faegre Drinker Biddle & Reath LLP

(57) ABSTRACT

A hard disk drive including a base deck with a base member and side walls extending from the base member. The side walls include a non-metallic material and include a structure made from the non-metallic material. The structure is arranged to dampen vibration. The side walls can be formed using an additive manufacturing process.

17 Claims, 6 Drawing Sheets

(56) References Cited

U.S. PATENT DOCUMENTS

| | | | |
|---|---|---|---|
| 11,281,184 B2* | 3/2022 | Mendonsa | ............ G11B 25/043 |
| 2003/0179488 A1 | 9/2003 | Kant et al. | |
| 2003/0218826 A1 | 11/2003 | Hong et al. | |
| 2009/0279246 A1* | 11/2009 | Nguyen | ............. G11B 33/1426 |
| | | | 361/679.54 |
| 2010/0061051 A1* | 3/2010 | Cochrane | ................ G06F 1/187 |
| | | | 361/679.35 |
| 2010/0238590 A1 | 9/2010 | Tashiro et al. | |
| 2011/0317310 A1 | 12/2011 | Kim et al. | |
| 2012/0155243 A1* | 6/2012 | Yokoyama | ............. F16F 7/1011 |
| 2012/0275105 A1 | 11/2012 | McGuire, Jr. | |
| 2013/0063838 A1 | 3/2013 | Otake et al. | |
| 2013/0208415 A1 | 8/2013 | Thijssen | |
| 2013/0335859 A1 | 12/2013 | Tatsumi et al. | |
| 2015/0187391 A1 | 7/2015 | Smirnov et al. | |
| 2016/0294244 A1 | 10/2016 | Bahr et al. | |
| 2016/0329081 A1 | 11/2016 | McGuire, Jr. | |
| 2018/0130504 A1 | 5/2018 | Ueki | |
| 2019/0287573 A1 | 9/2019 | Terasaki et al. | |
| 2020/0409336 A1* | 12/2020 | Mendonsa | ............ G11B 33/08 |
| 2022/0206458 A1* | 6/2022 | Mendonsa | ............ G11B 33/08 |

\* cited by examiner

ADAPTIVE MANUFACTURING SYSTEMS, METHODS, AND DEVICES

CROSS-REFERENCE TO RELATED APPLICATIONS

This application claims priority to U.S. patent application Ser. No. 16/455,304, filed Jun. 27, 2019, which is incorporated herein by reference in its entirety for all purposes.

SUMMARY

In certain embodiments, an apparatus includes a base deck, which includes a base member and sidewalls extending from the base member. The base member and the sidewalls both include a non-metallic material and a metallic stiffening material.

In certain embodiments, a hard disk drive includes a base deck and a spindle motor. The base deck includes a base member and sidewalls extending from the base member. The base member includes a first region and a second region. The first region includes a metallic stiffening material, and the second region includes a non-metallic material. The spindle motor is directly coupled to the first region.

In certain embodiments, a method is disclosed for manufacturing a base deck for a hard disk drive. The base deck includes a base member and sidewalls extending from the base member. The method includes providing a first region of the base member of the base deck. The first region includes a metallic stiffening material. The method further includes forming a second region of the base member of the base deck on the first region. The second region includes a non-metallic material.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
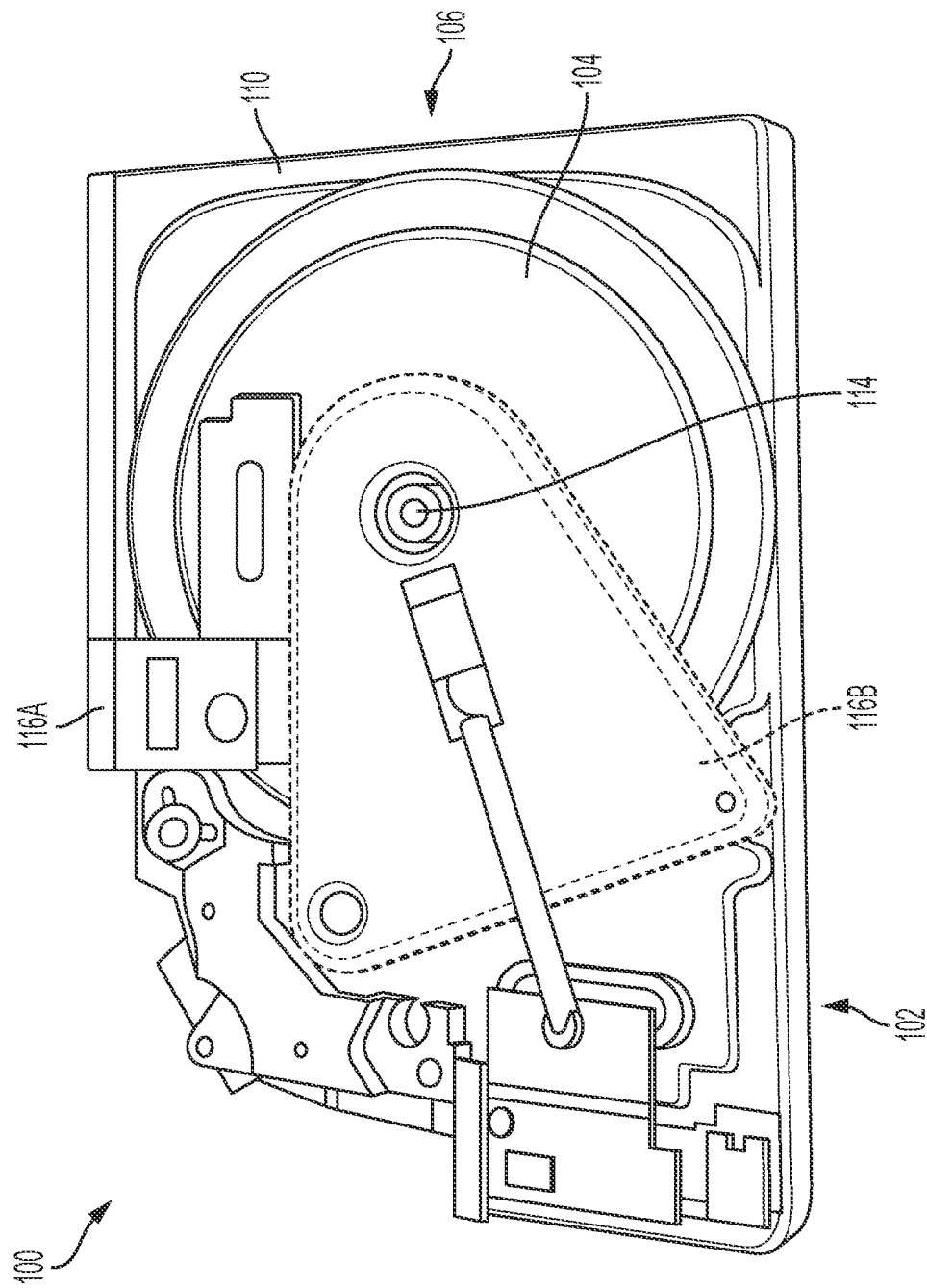
FIG. 1 shows a view of a bottom of a hard disk drive, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

Hard disk drives currently use base decks made from aluminum shells that are molded via vacuum injection processes. As hard disk drives continue to incorporate more and larger magnetic recording media (e.g., disk-shaped media), base decks continue to become thinner to accommodate the additional and/or larger media while still meeting the size requirements of the industry's standardized form factors (e.g., 2.5 inch form factor, 3.5 inch form factor). This thinning leads to base decks (and therefore hard disk drives) being more susceptible to shock and vibration during manufacture and while in end-customer environments (e.g., laptops, servers).

Certain embodiments of the present disclosure are directed to methods and devices that incorporate non-traditional materials into data storage devices (e.g., hard disk drives, solid state drives). Non-traditional materials and associated processes, both of which are described in more detail below, can be used to customize data storage products in ways that traditional materials (e.g., steel, aluminum) cannot be practically or feasibly used. The non-traditional materials can be used independently from, or in combination with, traditional materials for hard disk drive components.

Figure 2:
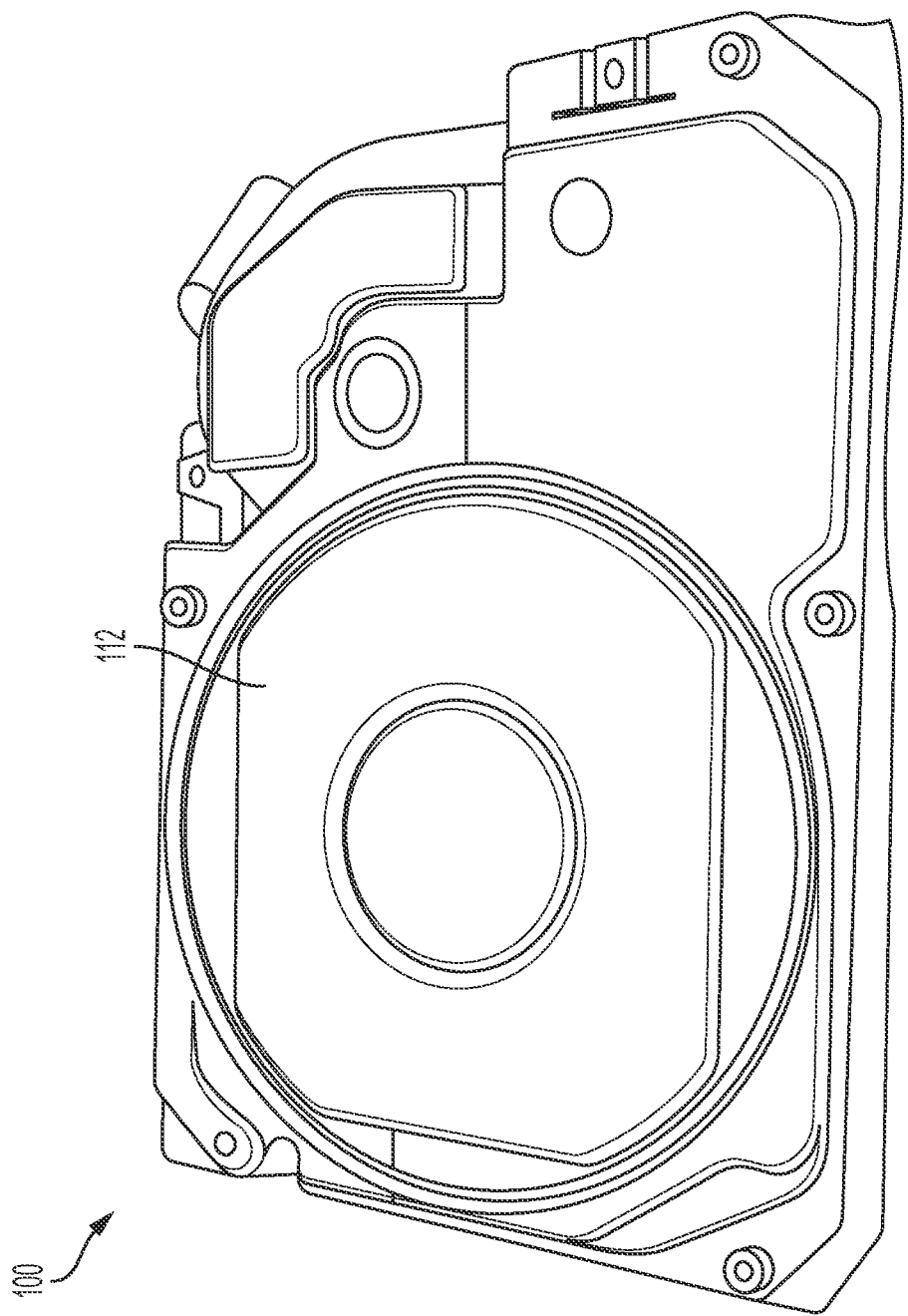
FIG. 2 shows a view of a top of the hard disk drive shown in FIG. 1, in accordance with certain embodiments of the present disclosure.
Figure 3:
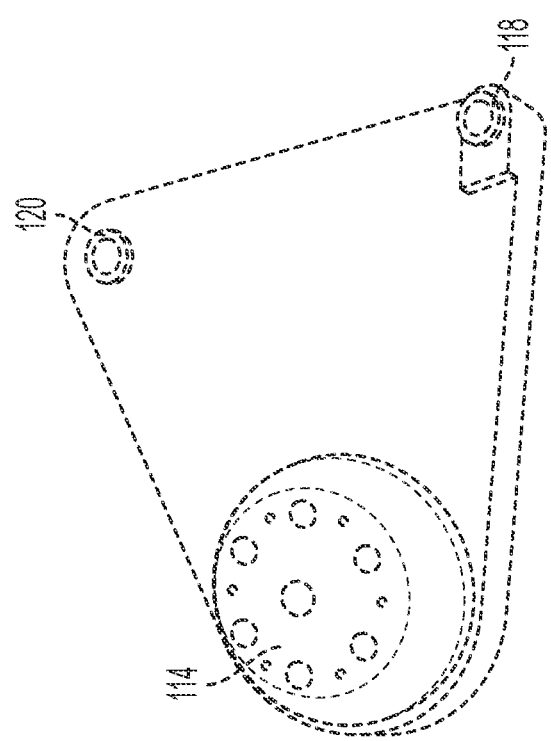
FIG. 3 shows a component of a hard disk drive base deck incorporated into the hard disk drive shown in FIGS. 1 and 2, in accordance with certain embodiments of the present disclosure.

FIG. 1 shows a bottom view of a hard disk drive 100, FIG. 2 shows a top view of the hard disk drive 100, and FIG. 3 shows a top view of a component of a base deck 102 of the hard disk drive 100. The base deck 102 can include a base member 104 with sidewalls 106 that form an internal cavity in which various hard disk drive components (e.g., magnetic recording media 110, actuator assembly, read/write heads) are positioned. When the hard disk drive 100 is assembled, a cover 112 (shown in FIG. 2) is coupled to the base deck 102 to enclose the hard disk drive components within the internal cavity. A spindle motor 114 is positioned within and secured to the base member 104 of the base deck 102.

In certain embodiments, the base deck 102 is comprised of multiple regions of different materials. The different regions are noted in FIGS. 1-3 with separate reference numbers (i.e., a first region 116A and a second region 116B) and different line types. The first region 116A is denoted with dashed lines, the second region 116B is denoted with solid lines.

In the embodiment shown in FIGS. 1-3, the first region 116A is shaped for and comprises a material (e.g., steel, aluminum) that provides a stiff structure. As shown in FIGS. 1 and 3, in certain embodiments, the first region 116A is triangular shaped. A stiff structure can be used to provide structural stability at certain points on the base deck 102. For example, the first region 116A can be used to provide a structure on which certain hard disk drive components are coupled to the base deck 102 at fixed positions relative to each other. Example components include the spindle motor 114, which is shown in FIG. 3 as being secured to the base deck 102 within the first region 116A. Another example component is a shaft or shaft retention feature 118 on which an actuator assembly (not shown) is rotatably coupled. Other example components can include a boss 120 for coupling to a parking ramp (not shown). In certain embodiments, the first region 116A is made of a single component that is stamped, machined, molded (e.g., vacuum injection molding), etc. In certain embodiments, the first region 116A is made via additive manufacturing techniques.

In the embodiment shown in FIG. 1, the second region 116B comprises the rest of the base deck 102. The second region 116B can comprise non-traditional materials and processes for hard disk drives such as composite materials that can be applied using additive manufacturing techniques commonly referred to as 3D printing.

Example materials include: polymers such as thermoplastics (e.g., polyethylene terephthalate, acrylonitrile butadiene styrene, polylactic acid, polyvinyl alcohol, polycarbonate), resins, sintered and annealed metals, and ceramics. In certain embodiments, the second region 116B contains a combination of non-traditional and traditional materials used in hard disk drives. For example, the second region 116B could include a sintered aluminum lattice that is filled or covered with a polymer or resin that is not traditionally used in base decks for hard disk drives. Example additive manufacturing techniques include: jetting (e.g., binder jetting), deposition (e.g., directed energy deposition), curing (e.g., directed curing of a resin or a photoresist), and extrusion (e.g., material extrusion such as fused deposition modeling and fused filament fabrication).

As mentioned above, non-traditional materials and associated processes can be used to customize data storage products in ways (e.g., geometries, structures) that traditional materials cannot be practically or feasibly manufactured or used. Example features for customization (discussed in more detail below) include features for windage-mitigation, air-flow management, vibration mitigation via passive or active damping, energy harvesting, thermal management, attachment points, non-op shock such as head parking ramps, among others.

Figure 4:
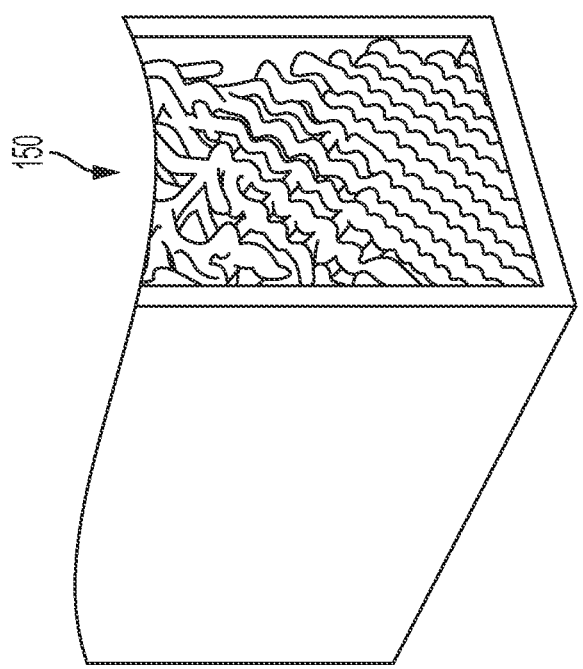
FIG. 4 shows an example lattice structure, in accordance with certain embodiments of the present disclosure.

As one specific example, the second region 116B of the base deck 102 can be formed via additive manufacturing to create lattice structures (e.g., mesh lattice structures) with particular vibration dampening characteristics. For example, particular designs of components (e.g., head-gimbal assemblies (HGAs) and suspensions) within the hard disk drive 100 that are effected by vibration may have different resonant frequencies. The specific resonant frequencies of the components may be determined during the design phase or the manufacturing phase of the hard disk drive 100. Based on the determined resonance properties of the specific components unique to a given hard disk drive (e.g., on a drive-by-drive basis, batch-by-batch basis, or model-by-model basis), the lattice structure of the material of the second region 116B can be adaptively modified as the second region 116B is being built. FIG. 4 shows an example internal lattice structure 150, which varies in shape (e.g., size of lattices, proximity of lattices with respect to each other). In certain embodiments, to the extent the second region 116B includes a lattice structure, the lattice structure can be substantially identical throughout the second region 116B. Further, the second region 116B can be made to have lattice structures at some portions of the region and to have solid portions at the other portions of the region. For example, the second region 116B can have lattice structures (as described in more detail below) at particular portions of the base deck 102 that couple the hard disk drive 100 to other structures (e.g., laptop frames, retaining structures in servers, carriers for servers). Other lattice structures are considered to be within the scope of the disclosure.

The lattice structure can be built such that the second region 116B (or particular portions thereof) dampens vibration at the particular resonant frequencies of the components. As another or additional option, the lattice structure of the second region 116B can be designed and built to dampen vibration frequencies most commonly subjected to the hard disk drive 100 from external sources (e.g., speakers in a laptop, fans in a server, adjacent hard disk drives in a server). For example, the lattice structure of the second region 116B can be designed to dampen particular frequencies or to have higher dampening properties at portions of the second region 116B where the hard disk drive 100 attaches to other structures (e.g., laptop frames, retaining structures in servers, carriers for servers). The lattice structures can be designed to help dissipate vibrations such that externally-generated or internally-generated vibration has less of an effect compared to hard disk drives made solely with traditional base deck materials.

In certain embodiments, the base deck 102 is created by coupling the second region 116B to the first region 116A. For example, the first region 116A—comprising the stiff structure—can be used as a substrate on which the second region 116B is coupled to during additive manufacturing processes. Layers of the second region 116B can be formed such that the second region 116B attaches to the first region 116A or forms around the first region 116A so that the first region 116A and the second region 116B are secured to each other. After the first region 116A and the second region 116B are secured to each other, the cover 112 can be coupled to the base deck 102.

Figure 5:
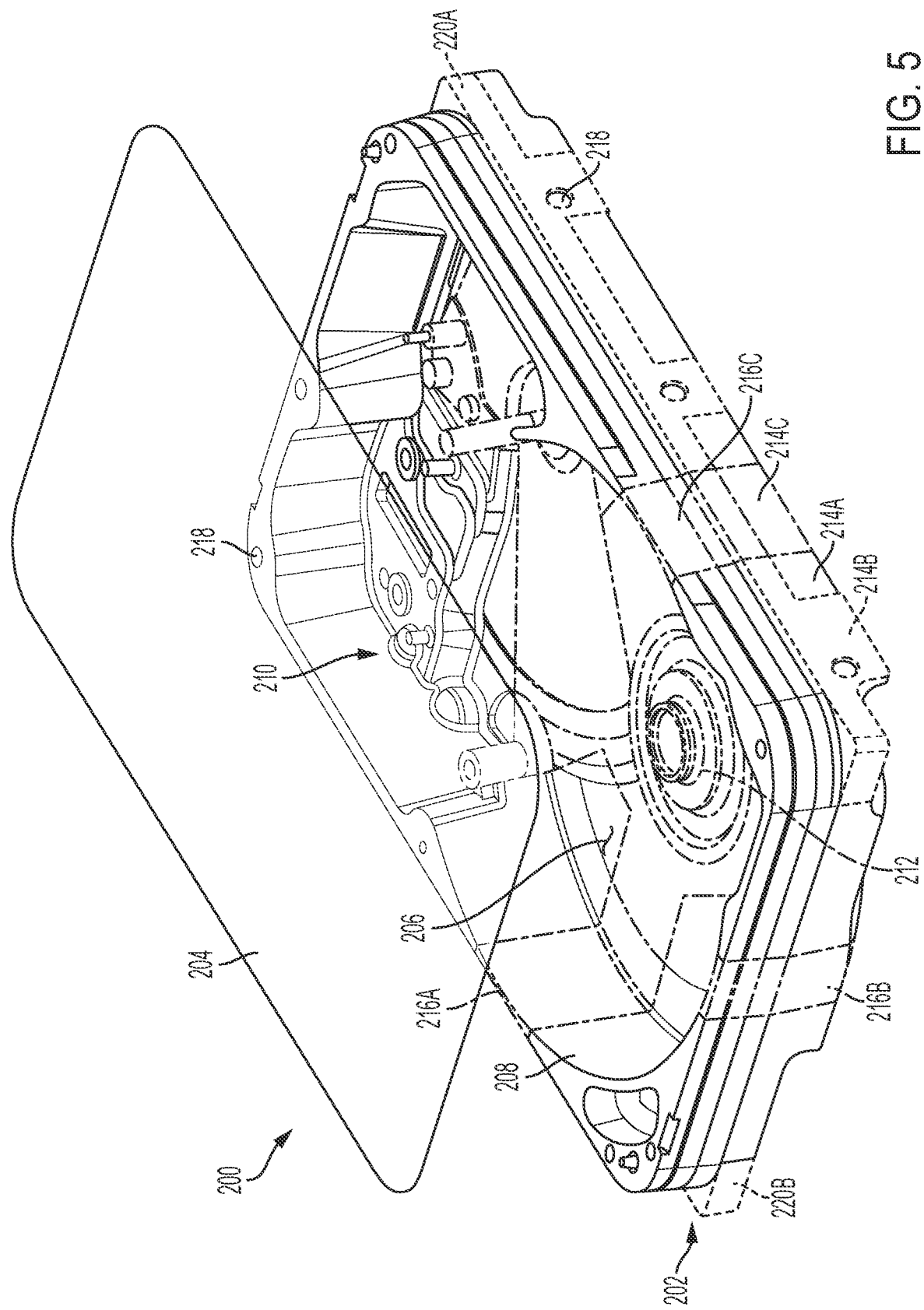
FIG. 5 shows a perspective, exploded view of a hard disk drive, in accordance with certain embodiments of the present disclosure.

FIG. 5 shows a perspective view of a hard disk drive 200 with a base deck 202 and a cover 204. The base deck 202 can include a base member 206 with sidewalls 208 that form an internal cavity 210 in which various hard disk drive components (e.g., magnetic recording media, actuator assembly, read/write heads) are positioned. When the hard disk drive 200 is assembled, the cover 204 is coupled to the base deck 202 to enclose the hard disk drive components within the internal cavity 210. A spindle motor 212 is positioned within and secured to the base member 206 of the base deck 202.

In certain embodiments, the base deck 202 is comprised of multiple regions of different materials. As shown in FIG. 5, different regions are noted with separate reference numbers (i.e., a first region 214A, a second region 214B, and a third region 214C) and different line types. The first region 214A is denoted with phantom lines, the second region 214B is denoted with dashed lines, and the third region 214C is denoted with solid lines.

In the embodiment shown in FIG. 5, the first region 214A is shaped for and comprises a material (e.g., steel, aluminum) that provides a stiff structure. A stiff structure can be used to provide structural stability at certain points on the base deck 202. For example, the first region 214A can be used to provide a structure on which certain hard disk drive components are coupled at fixed positions relative to each other (e.g., for feature alignment).

In the embodiment shown in FIG. 5, the first region 214A forms portions of the base member 206 and the sidewalls 208. FIG. 5 shows three portions 216A-C of the sidewalls 208 that are thinner (and therefore structurally weaker) than other portions of the sidewalls 208. These portions 216A-C of the sidewalls 208 can be made with materials such as steel or aluminum that may be more rigid than the materials of the second region 214B and the third region 214C to help prevent deformation at the thinner portions of the sidewalls 208.

The first region 214A can also be shaped to extend along portions of the base deck 202 that are commonly associated with stress points. Stress points are locations along the base deck 202 that typically experience higher levels of stress during manufacture or when installed in an end-customer environment. Example stress points include points at which components are fastened together or points where the base deck 202 itself is fastened to another device or component. Other example stress points include points at which bearing housings are secured to the base deck 202.

In certain embodiments, the first region 214A is made of a single component that is stamped, machined, molded, etc. In certain embodiments, the first region 214A is made via additive manufacturing techniques. Although the first region 214A is shown as being formed by a single piece of material, the first region 214A could include multiple, separate subregions that have areas of the second region 214B and/or the third region 214C coupled therebetween.

In the embodiment shown in FIG. 5, the second region 214B is shaped for and comprises a material (e.g., steel, aluminum, or plastics for snap fits) that provides a structure for coupling to fasteners (e.g., screws or snap fits). As shown in FIG. 4, the base deck 202 includes holes 218 for receiving and coupling to fasteners so that the hard disk drive 200 can be secured to various structures (e.g., frames in laptop computers, carriers or retainer structures for servers, etc.). These holes 218 can include threaded regions for coupling to threaded fasteners. In such embodiments, the material used for the second region 214B is strong enough to maintain the threaded fasteners with little deformation or without becoming stripped by the fasteners during assembly or disassembly. In certain embodiments, the second region 214B extends around a periphery of the sidewalls 208 such that holes on opposite side of the base deck 202 can receive and couple to fasteners. In other embodiments, instead of a single region for coupling to fasteners, the base deck 202 includes another region that provides a structure for coupling to fasteners. For example, as shown in FIG. 5, the second region 214B includes a first coupling member 220A and a second coupling member 220B opposite the first coupling member 220A. The first coupling member 220A and the second coupling member 220B are coupled together via the second region 214B and/or the third region 214C. In certain embodiments, a top surface (or portions thereof) of the base deck 202 includes the same material as the second region 214B. For example, the top surface also includes multiple holes 224 that may be threaded for receiving threaded fasteners. However, in FIG. 5, the top surface of the base deck 202 is shown as being part of the third region 214C, which may comprise a softer material than the first region 214A and the second region 214B. When coupling fasteners to the holes 218 on the top surface of the base deck 202, the fasteners are first coupled at the factory, which is likely to apply a more controlled, predictable force compared to the forces applied outside of the factory.

In the embodiment shown in FIG. 5, the third region 214C comprises the rest of the base deck 202 other than the first region 214A and the second region 214B. The third region 214C can comprise non-traditional materials and processes for hard disk drives such composite materials that can be applied using additive manufacturing techniques commonly referred to as 3D printing.

Example materials include: polymers such as thermoplastics (e.g., polyethylene terephthalate, acrylonitrile butadiene styrene, polylactic acid, polyvinyl alcohol, polycarbonate), resins, sintered and annealed metals, and ceramics. In certain embodiments, the third region 214C contains a combination of non-traditional and traditional materials used in hard disk drives. For example, the third region 214C could include a sintered aluminum lattice that is filled or covered with a polymer or resin that is not traditionally used in base decks for hard disk drives. Example additive manufacturing techniques include: jetting (e.g., binder jetting), deposition (e.g., directed energy deposition), curing (e.g., directed curing of a resign or a photoresist), and extrusion (e.g., material extrusion such as fused deposition modeling and fused filament fabrication).

As mentioned above, using non-traditional materials to form at least part of the base deck 202 can enable use of unique internal and external geometries that would be impossible or cost prohibitive with traditional materials. Similar to the example of FIGS. 1-3, the third region 214C could include lattice structures that are designed to dampen vibration (e.g., vibrations at particular resonant frequencies).

Figure 6:
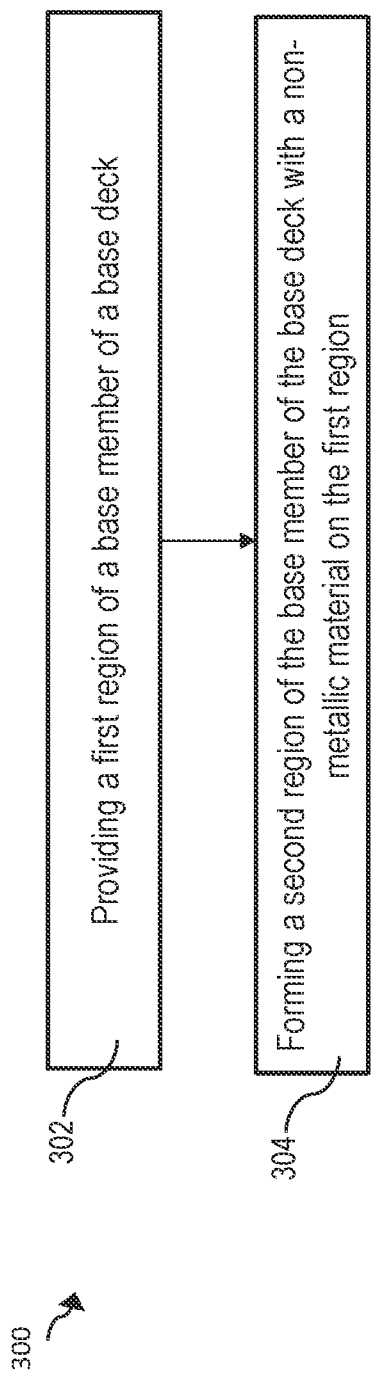
FIG. 6 shows a block diagram of steps of a method, in accordance with certain embodiments of the present disclosure.

Additionally or alternatively, the third region 214C can form features such as air-flow directors with non-traditional shapes and placement. Typically, air-flow directors are made from components separate from base decks that must be attached to the base decks during the manufacturing of hard disk drives. Separately manufacturing and attaching the air-flow diverters adds cost to hard disk drives and time to the manufacturing process. Using additive manufacturing, one or more air-flow diverters can be formed with the base deck. For example, one or more air-flow diverters can extend from one or more of the sidewalls 208 to divert or otherwise alter how air flows within the hard disk drive 200 manufacturing a base deck for a hard disk drive FIG. 6 shows a block representation of steps in a method 300 for manufacturing a base deck of a hard disk drive. The hard disk drive includes a base member and sidewalls extending from the base member. The method 300 includes providing a first region of the base member of the base deck (block 302 in FIG. 6). The first region can comprise a metallic material and can be shaped as described in the embodiments detailed above. The method 300 also includes forming a second region of the base member of the base deck with a non-metallic material on the first region (block 304 in FIG. 6). Forming the second region can include jetting the non-metallic material, depositing the non-metallic material, curing the non-metallic material, extruding the non-metallic material, or the like. Further, forming the second region can include forming an internal lattice structure, as described in more detail above. In certain embodiments, the second region comprises a polymer, a thermoplastic, or a resin. The method can further include forming the sidewalls from the non-metallic material. Further, the second region can be secured to the first region to form the base member.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A hard disk drive comprising:
   a base deck including a base member and side walls extending from the base member;
   wherein the side walls comprise a non-metallic material,
   wherein the side walls include a structure with the non-metallic material,
   wherein the structure comprises a lattice structure, and
   wherein the structure is arranged to dampen vibration.

2. The hard disk drive of claim 1, wherein the non-metallic material comprises a polymer.

3. The hard disk drive of claim 1, wherein the lattice structure is filled or covered with a polymer or with resin.

4. The hard disk drive of claim 1, wherein the lattice structure is formed between two walls.

5. The hard disk drive of claim 1, wherein the structure is configured to actively dampen vibration.

6. The hard disk drive of claim 1, wherein the structure is configured to passively dampen vibration.

7. The hard disk drive of claim 1, wherein the structure is configured to dampen a predetermined resonant frequency.

8. The hard disk drive of claim 7, wherein the predetermined resonant frequency is determined during a design phase of the hard disk drive.

9. The hard disk drive of claim 1, wherein the non-metallic structure is formed via an additive manufacturing method.

10. The hard disk drive of claim 1, further comprising a top cover coupled to the side walls to create an internal cavity.

11. A method for manufacturing a base deck for a hard disk drive, the base deck including a base member and side walls extending from the base member, the method comprising:

forming, using an additive manufacturing process, the base member and the side walls of the base deck of a non-metallic material by jetting the non-metallic material or by depositing the non-metallic material and then curing the non-metallic material; and forming, as part of the base member or the sidewalls, a structure arranged for dampening vibration, the structure comprising the non-metallic material.

12. The method of claim 11, wherein the non-metallic material comprises a polymer.

13. The method of claim 12, wherein the polymer comprises polyethylene terephthalate, acrylonitrile butadiene styrene, polylactic acid, polyvinyl alcohol, or polycarbonate.

14. The method of claim 11, wherein the side walls do not contain metal.

15. The method of claim 11, wherein the structure comprises a lattice structure.

16. The method of claim 11, wherein the structure is configured to actively dampen vibration.

17. The method of claim 11, wherein the structure is configured to dampen a predetermined resonant frequency selected during the design phase of the hard disk drive.

* * * * *